Sept. 26, 1939.　　　L. R. KIRKWOOD　　　2,173,907
AUTOMATIC FREQUENCY CONTROL CIRCUITS
Filed Sept. 30, 1937
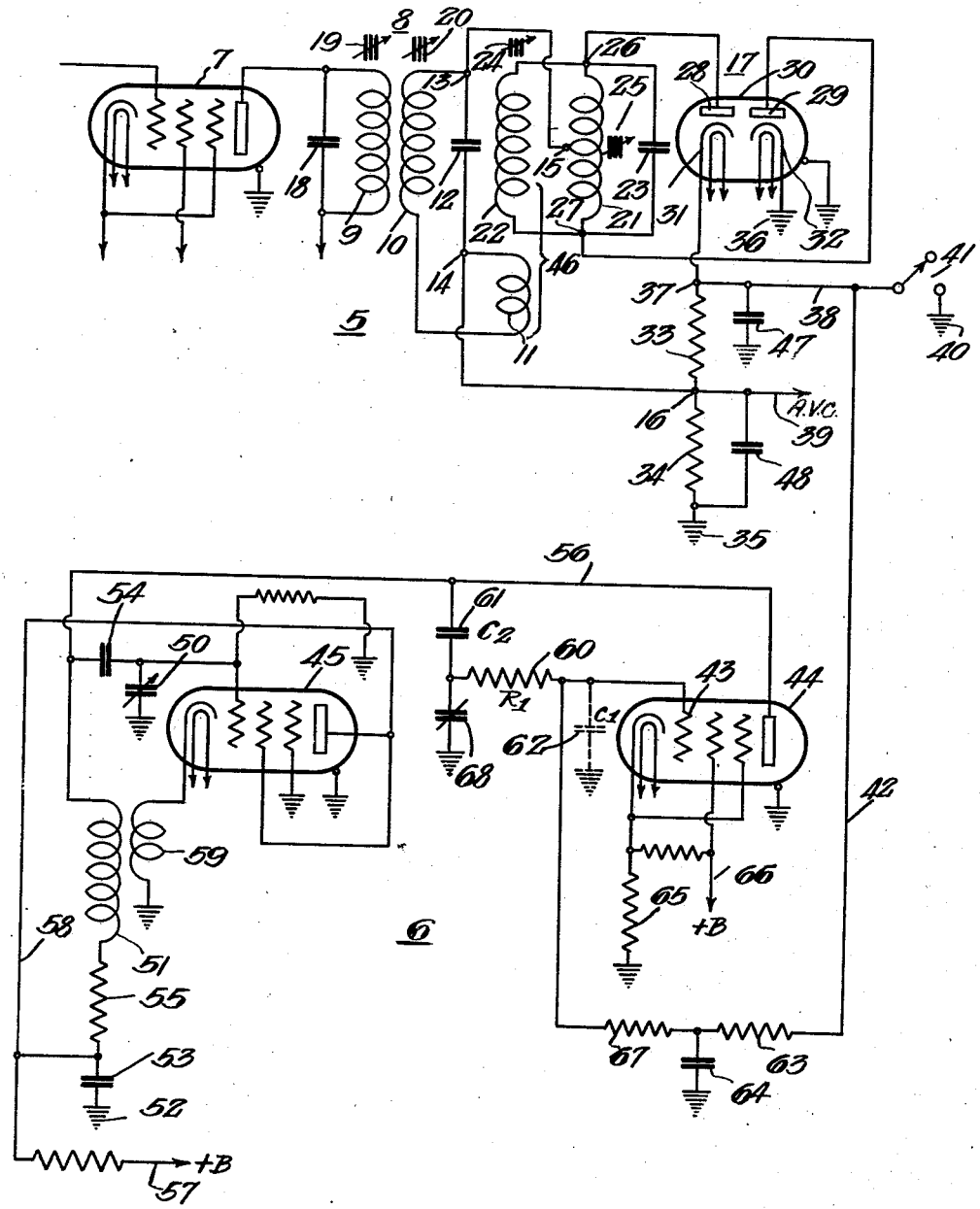
Inventor
Loren R. Kirkwood
By
Attorney Patented Sept. 26, 1939

2,173,907

UNITED STATES PATENT OFFICE 2,173,907

AUTOMATIC FREQUENCY CONTROL CIRCUITS

Loren R. Kirkwood, Collingswood, N. J., assignor to Radio Corporation of America, a corporation of Delaware Application September 30, 1937, Serial No. 166,690

10 Claims. (Cl. 250—20)

The present invention relates to automatic frequency control circuits, and has for its primary object to provide an improved automatic frequency control circuit having a high degree of stability in operation and a simplified design.

Automatic frequency control circuits to which the invention more particularly relates are incorporated in broadcast radio receivers and the like, and operate to correct for inaccurate tuning when such receivers are tuned automatically, by changing the frequency of the local oscillator in the receiver in such a manner that the resultant intermediate frequency formed will be at approximately the resonant frequency of the intermediate frequency amplifier circuits.

An automatic frequency control circuit embodying the invention may be divided into two parts comprising a frequency discriminator network and an oscillator control circuit, the latter receiving a control potential from the former.

The invention will, however, be better understood from the following description when considered in connection with the accompanying drawing and its scope will be pointed out in the appended claims.

In the drawing, to which attention is now directed, the figure is a schematic circuit diagram of an automatic frequency control circuit embodying the invention and comprising a frequency discriminator network 5 and an oscillator control circuit 6.

The frequency discriminator network is provided at the output of an intermediate frequency signal amplifying channel of which the tube 7 is the output tube. The latter is provided with an intermediate frequency output coupling transformer 8 having a tuned primary winding 9 and a tuned secondary winding 10. The secondary circuit of the transformer includes a coupling winding 11 in series with the secondary 10 and a shunt tuning capacitor 12, the windings 10 and 11 being connected in series across the capacitor.

The terminals of the transformer secondary circuit are indicated at 13 and 14 and are connected, respectively, to mid-tap terminals 15 and 16 on a double diode rectifier circuit 17 hereinafter described.

The primary and secondary circuits are turned to resonance at the intermediate frequency by a fixed capacitor 18 and the fixed capacitor 12, respectively, in conjunction with movable magnetite cores 19 and 20, making it possible to utilize variable inductances and fixed capacitors, as shown.

The rectifier circuit 17 comprises a center tapped choke coil 21 in parallel with a larger inductance element 22, the parallel combination being tuned by a shunt capacitor 23, as shown. The two inductances or choke coils and parallel capacitor 23 are tuned exactly to resonance by a movable magnetite core represented at 24 in the larger inductance winding, and the center tap on the choke coil 21 is adjusted electrically to the center of the winding by a movable magnetite core indicated at 25. The terminals of the tuned rectifier circuit are indicated at 26 and 27 and are connected with the anodes 28 and 29, respectively, of a double diode rectifier 30.

The cathodes of the rectifier, indicated at 31 and 32, are connected to the center tap 16 through rectifier output resistor elements 33 and 34, respectively, the latter being grounded as indicated at 35 whereby it is connected back to the cathode 32 through a similar ground connection 36. A terminal 37 is provided on the resistor 33 for deriving therefrom output controlling potentials through an output lead 38, and a similar output lead 39 is provided in connection with the terminal 16, whereby differing controlling potentials may be provided with respect to ground by said output leads.

In the present example, the circuit lead 38 may be connected to ground indicated at 40, through a manually controllable switch 41, and is also connected through a lead 42 with the control grid 43 of an oscillator control tube 44. The lead 39 is connected to control the automatic volume control elements of the receiver (not shown) and provides audio frequency output.

The direct current potential derived from the lead 38 with respect to ground is applied to the oscillator control tube 44 to change the frequency of the local oscillator 45 of the receiver. The discriminator network generates a negative bias at the terminal 37 with respect to ground, on one side of the intermediate frequency resonance point, a positive bias on the other side of the resonance point, and a zero bias at the resonance frequency. This depends upon the 90° phase difference that exists between the primary and secondary voltages of a double tuned, loosely coupled transformer at resonant frequency, and to a change in phase as the frequency is shifted through resonance.

In the present example, the loosely coupled tuned circuits comprise the intermediate frequency transformer secondary winding 10, the coupling winding 11 and the tuning capacitor 12 as the primary circuit of the discriminator network, which is tuned to resonance at the intermediate frequency. The primary circuit is loosely coupled through the coupling winding 11 with the secondary circuit of the network at either of the windings 22 or 21 but preferably to the latter at the center thereof, as indicated by the bracket 46.

The secondary tuned circuit of the network is provided by the inductance 22, shunt choke coil 21 and the tuning capacitor 23. Both circuits of the network are tuned to the same frequency. The intermediate frequency transformer input or primary circuit 9—10 is provided to improve the selectivity of the frequency discriminator network and to prevent excessive attenuation of side bands.

In the center tapped rectifier circuit, the voltage between the terminal 16 and the terminal 27 reaches maximum above resonance, for example, and the voltage between the terminal 16 and the terminal 26 reaches maximum below resonance, whereas the potentials may be equal at resonance, resulting in a zero differential voltage across the output resistors 33 and 34.

The coil 22 is connected across the rectifier circuit to adjust the inductance to the intermediate frequency resonance without affecting the electrical position of the mid-tap 15 on the circuit as provided by the coil 21. At the same time the coil or choke 21 may be adjusted to provide a symmetrical output circuit by electrically adjusting the center tap, and to reduce the distortion by this means.

By providing a separate inductance adjusting coil unit and a separate center tapping coil unit, both being adjusted by movable magnetite cores, the electrical tuning and electrical center tapping may be controlled, the one independently of the other. The addition of the tuned link circuit comprising the coupling coil 11 as the primary circuit, and a third tuned circuit as an input circuit permits the circuits of the network to be adjusted more readily in manufacture than has heretofore been possible, since each of the circuits may be adjusted independently of the others, without the use of variable capacitors, and without affecting the adjustment of the center tap, or the tuning of the secondary circuit when the center tap is adjusted.

Since the terminal connections of the output circuit 26 and 27 are connected each to a diode rectifier, a differential voltage is obtained between ground and the terminal 37, which may be negative with respect to ground on one side of resonance and positive on the other side of resonance, zero bias being obtained at resonance.

The primary circuit of the frequency discriminating network through the two rectifiers may be traced from the terminal 13 of the primary circuit, through the center tap connection 15, thence through the diode anodes 28 and 29 to the cathodes 31 and 32, thence through the resistors 33 and 34 to the center terminal 16 and the opposite side 14 of the primary circuit. Depending upon which side of resonance the input signal is delivered to the output of the intermediate frequency amplifier, the rectified component of the voltage induced in the secondary circuit 21—22—23 may aid or oppose the voltages existing in the resistors 33 and 34. The secondary circuit may be traced through the terminal 26 of the anode 28, the cathode 31, resistor 33 to the center tap 16, thence to the terminal 14, through the windings 11 and 10 back to the terminal 13 and the center tap 15.

Likewise the secondary circuit from the terminal 27 may be traced to the anode 29, the cathode 32, and to the ground 36—35, then to the resistor 34 and center tap 16, and thence through the primary circuit elements 11 and 10 back to the center tap 15.

From the foregoing description it will be seen that the frequency discriminator network or automatic frequency control is coupled to a tuned output circuit of an intermediate frequency amplifier to provide a higher degree of selectivity to the discriminator circuit, and comprises the tuned secondary circuit of such an output transformer loosely coupled as the tuned primary circuit of the discriminator network, to a tuned secondary circuit of such network comprising two inductance elements in parallel with a fixed capacitor element, one of the inductance elements being provided with an electrical center tap. Furthermore, the center tap is electrically adjustable by means of a movable core independently of a second movable core for tuning the secondary circuit of the discriminator network, the second movable core being located in the other of the parallel-connected secondary coils or chokes.

This circuit in connection with a single diode rectifier of the double diode type results in a simplified and stabilized discriminator circuit. The separate center tapping arrangement permits exact electrical centering of the circuit and provides an adjustment for eliminating distortion, while the independent tuning adjustment permits the discriminator circuit to be exactly tuned to resonance without disturbing the center tapping adjustment.

Referring further to the oscillator control circuit, the oscillator 45 may include any suitable tuned circuit comprising a shunt tuning capacitor indicated at 50 connected in parallel with a tuning inductance 51 through ground 52 and a filter capacitor 53. An oscillator series tracking capacitor is indicated at 54 and a controlling resistor 55 is included in the oscillator tuned circuit to reduce the strength of the oscillations to a predetermined value.

The plate circuit of the oscillator control tube 44 is indicated at 56 and is connected through the oscillator tuning inductance 51 and the resistor 55 to a source of plate terminal 57. Plate potential for the oscillator is also derived from the same source through a lead 58. The feed-back coil for the oscillator is indicated at 59 and is connected in circuit with the cathode. This is a preferred arrangement and although any suitable oscillator circuit may be provided wherein a control tube may be connected as shown to represent an inductance which may be varied by varying the direct current bias of the control grid. In the present example this is accomplished by connecting the control grid 43 of the control tube to the output of the discriminator network providing the control potential which varies in magnitude and polarity with variations in the tuning above and below resonance.

In the present example, furthermore, and as a preferred arrangement, the grid 43 of the control tube 44 is coupled to the oscillator circuit through a resistor 60 and a series capacitor 61, the latter being in the nature of a direct current isolating capacitor and having a low impedance at oscillator frequencies.

A 90° phase voltage is obtained by making the resistor 60 relatively large with respect to the impedance of the input capacity of the oscillator control tube 44, which capacity is indicated in dotted lines at 62. A series resistor 63 and a shunt by-pass capacitor 64 in the direct current bias control circuit for the control tube grid 43 provides a filter and predetermined time delay in the application of control potential to the control tube from the discriminator network. The control tube is provided with biasing potential from a cathode resistor 65 which operates as a combined self-bias and bleeder current resistor from the screen grid supply circuit indicated at 56. This bias is initially adjusted so that the oscillator operates at the desired frequency to produce the exact intermediate frequency when tuned to resonance and variations from resonance is counteracted by the application of control potential of varying magnitude and polarity with respect to the fixed bias as received from the discriminator network. The initial bias is also so adjusted that the control tube is operated in response to signals to give the same control range of operation on either side of resonance. The resistor indicated at 67 is a grid resistor for the grid 43 and the capacitor indicated at 68 is the oscillator shunt trimmer capacitor.

The fundamental requirement for the control circuit is to convert the D. C. voltage from the discriminator network into reactance variations to be shunted across the oscillator tuned circuit. In the present example, the oscillator voltage is impressed across the resistance capacity network 61—60—62. As the capacitor 61 is used only as a blocking capacitor for direct current, and has practically no reactance at the oscillator frequency, the oscillator potential is impressed substantially across the resistor 60 and the capacity 62. The latter includes the input capacity of the control tube and the distributed capacity of the associated wiring. The value of resistor 60 is so chosen with respect to the reactance of the capacity 62 that the proper amount of oscillator voltage is impressed upon the grid of the control tube.

The operation of the circuit is such that the voltage across the input capacity 62 lags behind the voltage of the oscillator by approximately 90°, and the vector sum of the voltage across the capacity 62 and the resistor 60 is equal to the oscillator voltage. The voltage across the input capacity 62 is amplified by the control tube and adds vectorially to the original oscillator voltage, being transmitted to the oscillator tuned circuit through the circuit 56, and results in a corrective change in the oscillator frequency.

The degree of frequency shift of the oscillator depends upon the mutual conductance of the control tube 44 and the strength of the oscillator voltage. It has been found that to obtain the maximum frequency variation, it is desirable that the discriminator circuit or network provide a range of control potentials or bias voltage for the control tube which may provide operation of the latter from substantially anode current cut-off up to the point at which the tube draws grid current.

The resistor 55 being placed in series with the oscillator tank or tuned circuit permits the oscillator output to be reduced at the low frequency end of the tuning range of the oscillator, and for this reason the series resistor 60 between the oscillator and the control tube grid may be made relatively low in value for the same voltage across the input capacity 62 at the low frequency end of the tuning range of the oscillator. This has been found to provide a greater degree of symmetry about the control point or mean oscillator frequency and a wider range of control action on the oscillator by the control tube at the high frequency end of the tuning range where the tuning is somewhat more crowded.

In a circuit of the type referred to, the series resistor 60 may have a value of substantially 120,000 ohms when using an oscillator and oscillator control tube of the type known commercially as the RCA 6J7 type.

It will be noted that the cathode 32 is grounded and in order to cut off the automatic frequency control, the remaining cathode 31 is also grounded through the switch 41, thereby cutting off the control potential from the control tube and permitting the control tube to operate only on its fixed bias to establish the oscillator frequency at its mean value for any tuning adjustment of the oscillator. It will also be noted that the resistors 33 and 34 are provided with suitable intermediate frequency by-pass capacitors 47 and 48.

From the foregoing description, it will be seen that the tuned circuit of the oscillator is provided with a control circuit which converts the bias potential from the discriminator network into reactance variations across the oscillator tuned circuit, and that this arrangement is provided by coupling the anode circuit of the control tube to the oscillator tuned circuit preferably directly, as shown, and coupling the control grid of the control tube to the oscillator circuit through a series resistor and the input capacity of the control tube, in such a manner that the oscillator voltage appearing across the input capacity is amplified and applied through the control tube plate circuit to the oscillator tuned circuit in such a manner as to add vectorially to the original oscillator voltage thereby controlling the oscillator frequency. The mean frequency of the oscillator is adjusted by a fixed bias on the control tube with respect to which the discriminator voltage is added or subtracted to effect such change in the oscillator frequency as to set up the desired intermediate frequency and to maintain the desired intermediate frequency.

I claim as my invention:

1. In a radio apparatus comprising tuned signal conveying circuits, the combination in one of said circuits of a pair of parallel-connected tuning inductance windings, one of said windings having a tap connection thereon, means for adjusting the tuning of said one circuit comprising an adjustable core element for the other of said windings, and means for adjusting said tap connection to an electrical center comprising a movable core element for said first named inductance winding.

2. In an automatic frequency control system, means providing a frequency discriminating network providing a direct current output potential which varies in magnitude and polarity with variations in frequency above and below the resonance, an oscillator having a tunable oscillator circuit, means for converting the direct current voltage from said network into reactance variation in shunt with said oscillator tuned circuit, said first named means comprising two tuned loosely coupled circuits, one of said circuits including two parallel-connected inductance windings, one of said windings having an electrical center tap, means for adjusting said center tap comprising a movable magnetite core for said winding, and means for adjusting the tuning of said one circuit comprising a second movable magnetite core for the other of said windings, and said second named means comprising a control tube responsive to bias potential variations derived from said discriminator network and having in conjunction with associated wiring a predetermined input capacity, a resistor connected in series with said capacity, means for coupling said control tube to said oscillator circuit to apply amplified oscillations thereto, and means connecting said resistor and input capacity in series across said oscillator tuned circuit.

3. In an automatic frequency control circuit, the combination of means providing a tuned primary circuit and a tuned secondary circuit, means for loosely coupling said circuits, a center tapped inductance and a second inductance connected in parallel in said secondary circuit, means providing a connection between one side of the primary circuit and the center tap on said first named inductance, means for tuning said secondary circuit including a shunt capacitor connected in parallel with said inductances, means for adjusting the tuning of said secondary circuit comprising a movable magnetite core for the second named inductance, and means for adjusting said center tap electrically on the first named inductance comprising a second magnetite core movable with respect to said inductance and adjacent to said center tap.

4. In an automatic frequency control circuit comprising tuned loosely coupled primary and secondary circuits, the combination in the secondary circuit of a pair of parallel-connected inductance windings, one of said windings having a higher inductance than the other and said other winding having a center tap connection, means for adjusting the tuning of said secondary circuit comprising an adjustable magnetite core for the higher inductance winding, and means for adjusting said center tap electrically comprising a movable magnetite core for the other of said inductance windings.

5. In an automatic frequency control circuit the combination with a tunable oscillator, of a frequency discriminating network and an oscillator frequency control circuit, said network comprising a tuned primary circuit and a tuned secondary circuit, means for loosely coupling said circuits, a diode rectifier connected with said secondary circuit providing a balanced direct current potential output circuit for said network, means in said secondary circuit providing an electrical center tap element therefor and a tuning adjustment element, said first-named element comprising a choke coil having a center tap and a magnetite core therein adjustable adjacent to said center tap and said second named element comprising a second choke coil having a higher inductance than the first named choke coil and provided with a movable magnetite core for varying the inductance thereof.

6. In an automatic frequency control circuit the combination with a tunable oscillator, of a frequency discriminating network and an oscillator frequency control circuit, said network comprising a tuned primary circuit and a tuned secondary circuit, means for loosely coupling said circuits, a diode rectifier connected with said secondary circuit providing a balanced direct current potential output circuit for said network, means in said secondary circuit providing an electrical center tap element therefor and a tuning adjustment element, said first named element comprising a choke coil having a center tap and a magnetite core therein adjustable adjacent to said center tap and said second named element comprising a second choke coil having a higher inductance than the first named choke coil and provided with a movable magnetite core for varying the inductance thereof, and means for converting the direct current voltage from said balanced output circuit of the discriminator network into reactance variations shunted across the oscillator tuned circuit.

7. In an intermediate frequency amplifier, the combination with an intermediate frequency output transformer having a tuned primary winding and a tuned secondary winding, of a frequency discriminator network including the tuned secondary winding and a coupling winding, means providing a third tuned circuit comprising a pair of parallel-connected inductance windings and a shunt tuning capacitor, said third circuit being loosely coupled to said tuned secondary circuit through said coupling winding, a diode rectifier having a pair of anodes one connected with each side of said third tuned circuit and having a pair of cathodes, means providing a center tapped resistance connection between said cathodes, means providing a center tap on one of said inductance windings, said secondary tuned circuit being connected between said last-named center tap and the center tap on said resistance connection, means including a movable magnetite core for said center tap inductance winding for electrically adjusting said center tap, and a second magnetite core for the other of said inductance windings for adjusting the tuning of said third tuned circuit.

8. In an intermediate frequency amplifier, the combination with an intermediate frequency output transformer having a tuned primary winding and a tuned secondary winding, of a frequency discriminator network including the tuned secondary winding and a coupling winding, means providing a third tuned circuit comprising a pair of parallel-connected inductance windings and a shunt tuning capacitor, said third tuned circuit being loosely coupled to said tuned secondary circuit through said coupling winding, a diode rectifier having a pair of anodes one connected with each side of said third tuned circuit and having a pair of cathodes, means providing a center tapped resistance connection between said cathodes, means providing a center tap on one of said inductance windings, said secondary tuned circuit being connected between said last named center tap and the center tap on said resistance connection, means including a movable magnetite core for said center tap inductance winding for electrically adjusting said center tap and a second magnetite core for the other of said inductance windings for adjusting the tuning of said third tuned circuit, an oscillator having a tuned circuit and means for converting the direct current voltage output from said resistance into reactance variations in shunt with said oscillator tuned circuit, said last named means including a control tube having a predetermined grid input capacity, a resistor in series therewith, means for connecting said resistor and input capacity in parallel with the oscillator tuned circuit, and means providing a connection between said control tube and said output resistor for applying thereto a controlling potential.

9. In an intermediate frequency amplifier, the combination with an intermediate frequency output transformer having a tuned primary winding and a tuned secondary winding, of a frequency discriminator network including the tuned secondary winding and a coupling winding, means providing a third tuned circuit comprising a pair of parallel-connected inductance windings and a shunt tuning capacitor, said third tuned circuit being loosely coupled to said tuned secondary circuit through said coupling winding, a diode rectifier having a pair of anodes one connected with each side of said third tuned circuit and having a pair of cathodes, means providing a center tapped resistance connection between said cathodes, means providing a center tap on one of said inductance windings, said secondary tuned circuit being connected between said last named center tap and the center tap on said resistance connection, means including a movable magnetite core for said center tap inductance winding for electrically adjusting said center tap and a second magnetite core for the other of said inductance windings for adjusting the tuning of said third tuned circuit, an oscillator having a tuned circuit and means for converting the direct current voltage output from said resistance into reactance variations in shunt with said oscillator tuned circuit, said last named means including a control tube having a predetermined grid input capacity, a resistor in series therewith, means for connecting said resistor and input capacity in parallel with the oscillator tuned circuit, means providing a connection between said control tube and said output resistor for applying thereto a controlling potential, means providing a time delay filter in said last named connection, and means for applying to said control tube an initial biasing potential for establishing in said oscillator circuit a predetermined minimum frequency.

10. In an automatic frequency control system comprising tuned coupled signal conveying circuits, the combination in one of said circuits of a pair of parallel-connected tuning inductance windings, one of said windings having a tap connection thereon, means for adjusting the tuning of said one circuit comprising an adjustable core element for the other of said windings, and means for adjusting said tap connection to an electrical center comprising a movable core element for said first-named inductance winding.

LOREN R. KIRKWOOD.